US011901110B2

(12) United States Patent
Yamanaka et al.

(10) Patent No.: US 11,901,110 B2
(45) Date of Patent: Feb. 13, 2024

(54) COIL COMPONENT

(71) Applicant: Murata Manufacturing Co., Ltd., Kyoto-fu (JP)

(72) Inventors: Hiromitsu Yamanaka, Nagaokakyo (JP); Masayuki Oishi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 414 days.

(21) Appl. No.: 17/184,293

(22) Filed: Feb. 24, 2021

(65) Prior Publication Data

US 2021/0265098 A1 Aug. 26, 2021

(30) Foreign Application Priority Data

Feb. 25, 2020 (JP) ................................ 2020-029590

(51) Int. Cl.

*H01F 27/28* (2006.01)
*H01F 27/245* (2006.01)
*H01F 41/02* (2006.01)
*H01F 41/04* (2006.01)

(52) U.S. Cl.

CPC ....... *H01F 27/2804* (2013.01); *H01F 27/245* (2013.01); *H01F 41/0233* (2013.01); *H01F 41/041* (2013.01); *H01F 2027/2809* (2013.01)

(58) Field of Classification Search

CPC ............... H01F 27/2804; H01F 27/245; H01F 41/0233; H01F 41/041; H01F 2027/2809; H01F 41/043; H01F 41/046; H01F 17/0013; H01F 27/292; H01F 2017/0066

USPC ........................................ 336/200, 232, 198

See application file for complete search history.

(56) References Cited

U.S. PATENT DOCUMENTS

2009/0051476 A1* 2/2009 Tada .................. H01F 17/0013 336/200
2012/0326827 A1* 12/2012 Nanjyo ............... H01F 17/0033 336/200
2018/0218829 A1* 8/2018 Endo .................. H01F 17/0013
2018/0323005 A1* 11/2018 Sato .................... H01F 17/0013

FOREIGN PATENT DOCUMENTS

JP H11-219821 A 8/1999
JP 2015-070172 A 4/2015

* cited by examiner

*Primary Examiner* — Shawki S Ismail
*Assistant Examiner* — Kazi S Hossain
(74) *Attorney, Agent, or Firm* — Studebaker & Brackett PC

(57) ABSTRACT

A coil component in which stress is relieved and a coil is stably positioned is to be provided. A coil component of the present disclosure includes a base body; and a coil provided in the base body. The base body includes a plurality of laminated magnetic layers. The coil includes a plurality of laminated coil wirings. The magnetic layers and the coil wirings are alternately laminated. A gap portion is provided between each of the magnetic layers and each of the coil wirings. Part of the coil wirings contacts the magnetic layers, and a region containing a metal oxide is present on part of a surface of each of the coil wirings on a side of the gap portion.

19 Claims, 9 Drawing Sheets

COIL COMPONENT

CROSS-REFERENCE TO RELATED APPLICATION

This application claims benefit of priority to Japanese Patent Application No. 2020-029590, filed Feb. 25, 2020, the entire content of which is incorporated herein by reference.

BACKGROUND

Technical Field

The present disclosure relates to a coil component and a manufacturing method thereof.

Background Art

A conventional coil component is disclosed in Japanese Patent Application Laid-Open No. H11-219821. In Japanese Patent Application Laid-Open No. H11-219821, a gap portion is provided for relieving the stress between a conductive layer and a magnetic layer and the gap portion is provided on the entire periphery of the conductive layer.

SUMMARY

In the coil component disclosed in Japanese Patent Application Laid-Open No. H11-219821, the conductive layer and the magnetic layer forming the coil are not in direct contact, and the position of the coil may be unstable in such a coil component.

Accordingly, the present disclosure provides a coil component in which stress is relieved and a coil is stably positioned.

A coil component as an aspect of the present disclosure includes a base body; and a coil provided in the base body. the base body includes a plurality of laminated magnetic layers. The coil includes a plurality of laminated coil wirings, and the magnetic layers and the coil wirings are alternately laminated. A gap portion is provided between each of the magnetic layers and each of the coil wirings. Part of the coil wirings is in contact with the magnetic layers, and a region containing a metal oxide is present on part of a surface of each of the coil wirings on a side of the gap portion.

According to the above embodiment, due to the presence of the gap portion between the magnetic layer and the coil wiring, the stress between the magnetic layer and the coil wiring is relieved. Further, since at least part of the coil wiring is in contact with the magnetic layer, the coil wiring is stably positioned as compared to the case where the gap portion is present on the entire periphery of the coil wiring.

In an embodiment of the coil component, a melting point of a metal contained in the metal oxide is 850° C. or less.

According to the above embodiment, the metal is melted before sintering of a conductive paste that will become the coil wiring is completed, and the gap portion can be easily formed.

In an embodiment of the coil component, the metal oxide includes at least one of Cu oxide, Zn oxide, Bi oxide, and Sn oxide.

A metal contained in the metal oxide in the above embodiment is a metal that melts at a temperature lower than the sintering temperature of a coil conductive paste that will become the coil wiring, and/or a metal that can be used as a material constituting the magnetic layer. In this configuration, since the metal is melted during temperature rise to the sintering temperature, the gap portion can be easily formed, and/or the same material as the magnetic layer can be used, the metal oxides formed outside the coil wiring is absorbed and integrated into the magnetic layer of the base body at the time of firing, and thus variation in size of the gap portion can be reduced, and this can contribute to the suppression of variation in the impedance value and inductance value of the coil component.

In an embodiment of the coil component, a shape of the region containing the metal oxide includes at least one of a land-like shape and a band-like shape.

According to the above embodiment, since the region containing the metal oxide is scattered or dispersed on the surface of the coil wiring, the gap portion can be uniformly formed on the surface of the coil wiring.

In an embodiment of the coil component, the shape of the region containing the metal oxide includes a land-like shape, and the land-like shape has an equivalent circle diameter of 0.1 μm or more.

In the above embodiment, since the land-like shape has an equivalent circle diameter of 0.1 μm or more, a certain amount of metal used for forming the gap portion is obtained. As a result, the gap portion is easily formed.

In the above embodiment, a proportion (also referred to as "coverage") of the region containing the metal oxide is 10% or more and 80% or less (i.e., from 10% to 80%) of a surface area of the coil wiring.

According to the above embodiment, when the gap portion is formed by utilizing the melting of metal as a raw material of the metal oxide, due to the fact that the proportion of the region containing the metal oxide is 10% or more, the gap portion can be reliably formed on the surface of the coil wiring. In addition, the region containing the metal oxide does not necessarily need to be formed on the entire coil wiring, and it is sufficient that the proportion thereof is 80% from the viewpoint of the formation of the gap portion.

According to the above embodiment, a maximum thickness of the gap portion is in a range of 0.5 μm or more and 8.0 μm or less (i.e., from 0.5 μm to 8.0 μm).

According to the above embodiment, due to the presence of the gap portion, the effect of stress relief is exerted. Further, since the thickness of the gap portion is in a certain range, the coil component can obtain an impedance value and an inductance value.

According to the above embodiment, the gap portion is present on a surface of the coil wiring on one side in a lamination direction.

According to the above embodiment, due to the presence of the gap portion on one side in the lamination direction, the effect of stress relief is exerted. Further, since the magnetic layer is present on the other side in the lamination direction, the coil conductor is stably positioned, and the coil component can obtain an impedance value and an inductance value.

According to the above embodiment, a method for manufacturing a coil component includes: a step of forming a metal-containing layer on a magnetic sheet that becomes a magnetic layer after being fired; a step of forming, on the metal-containing layer, a coil conductive paste layer that becomes a coil wiring after being fired; and a step of providing a region containing a metal oxide on a surface of the coil wiring while forming a gap portion between the coil wiring and the magnetic layer by melting a metal contained in the metal-containing layer by firing.

According to the above embodiment, since the heat generated at the time of firing is utilized and the melting of the metal contained in the metal-containing layer is utilized, the gap portion is easily formed.

According to the coil component of the present disclosure, stress can be relieved and the coil can be stably positioned.

DETAILED DESCRIPTION

Figure 1:
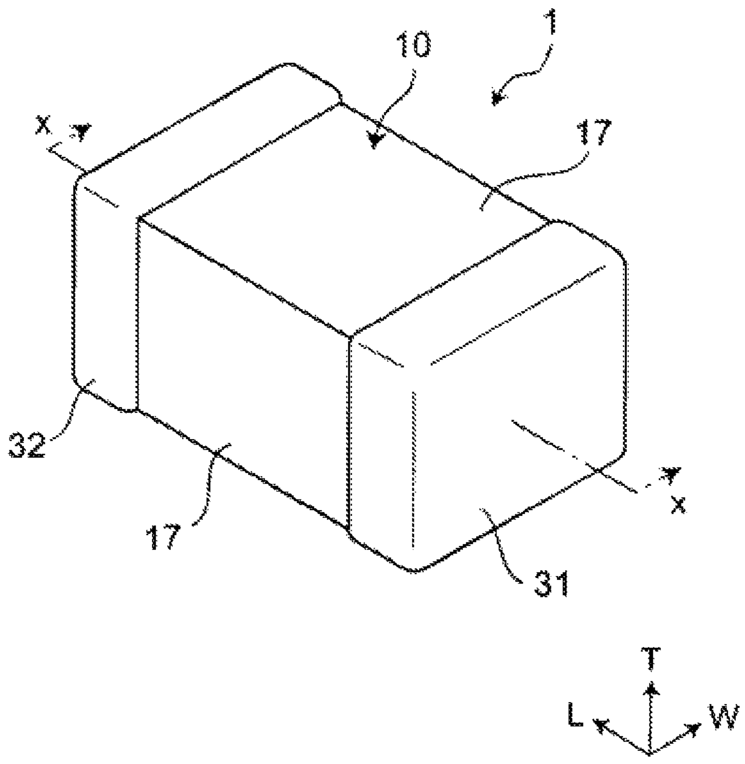
FIG. 1 is a perspective view showing a first embodiment of a coil component.

A coil component that is an aspect of the present disclosure will be described in detail in embodiments shown in the drawings. Note that the drawings may in part include schematic ones and not reflect actual dimensions and ratios.

FIRST EMBODIMENT

Figure 2:
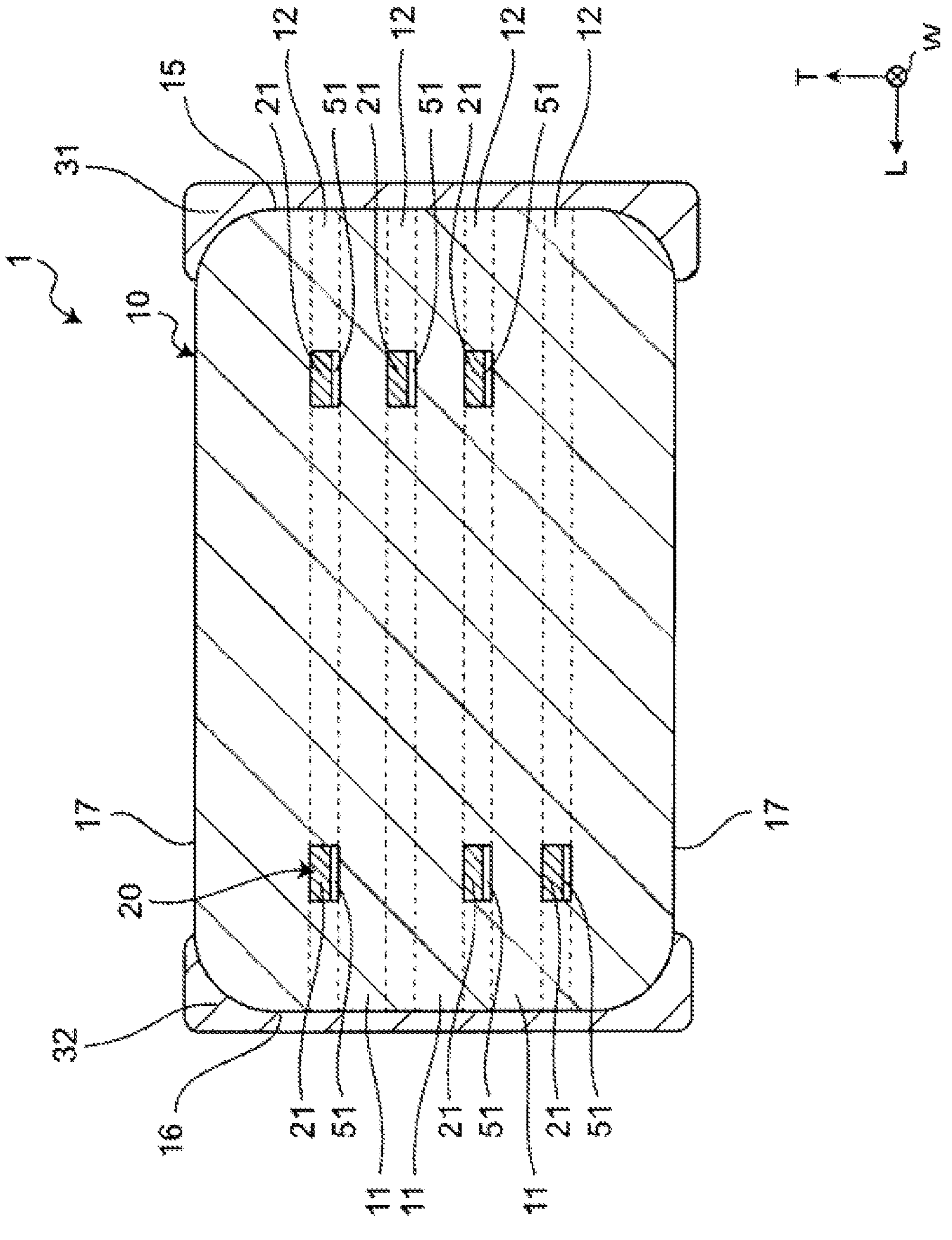
FIG. 2 is an X-X sectional view of the coil component in FIG. 1.
Figure 3:
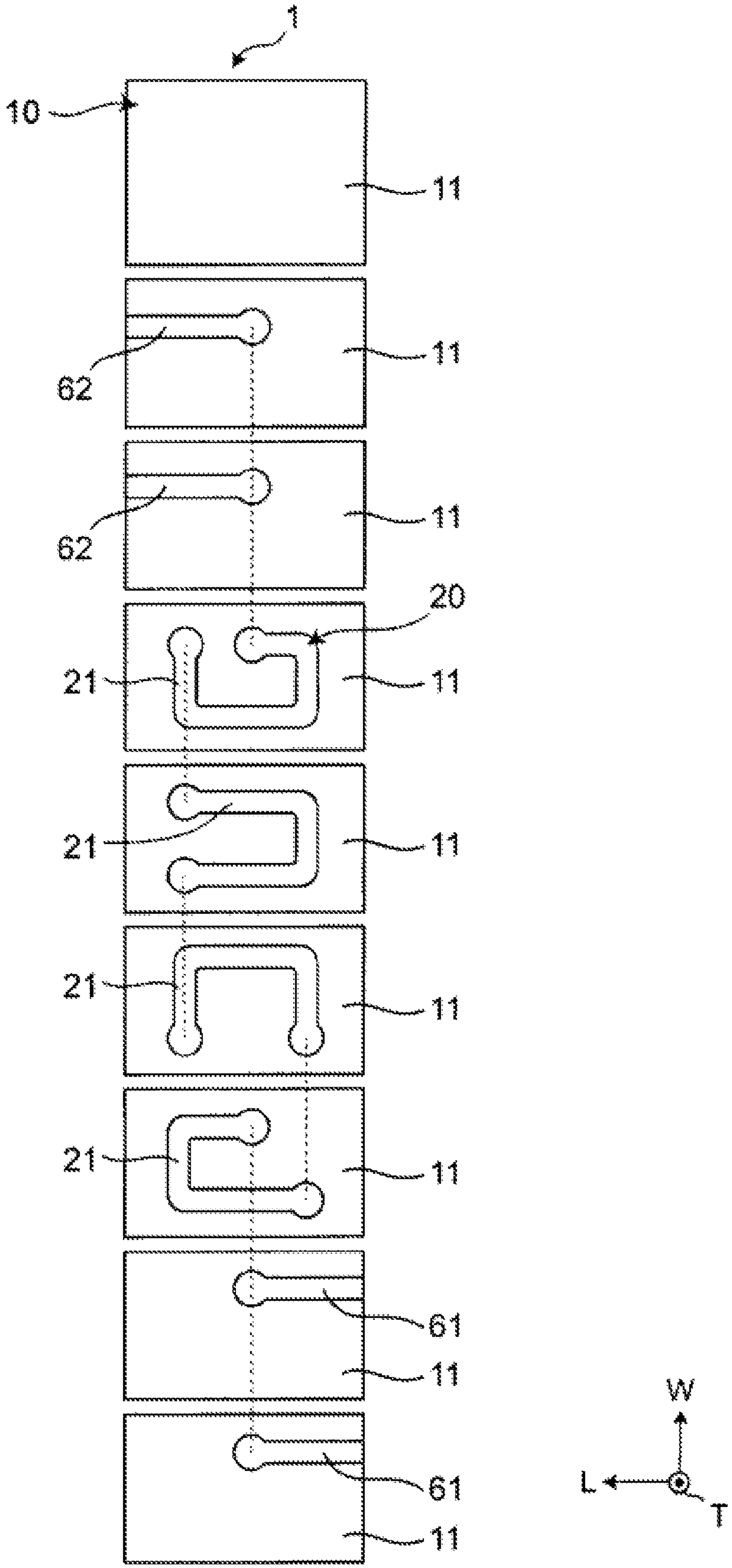
FIG. 3 is an exploded plan view of the coil component.

FIG. 1 is a perspective view showing a first embodiment of a coil component. FIG. 2 is an X-X sectional view of the first embodiment shown in FIG. 1 and is an LT sectional view passing through a center in a W direction. FIG. 3 is an exploded plan view of the coil component and represents diagrams along a T direction from the bottom to the top of the figure. Note that the L direction is a length direction of the coil component 1, the W direction is a width direction of the coil component 1, and the T direction is a height direction (first direction) of the coil component 1.

As shown in FIG. 1 to FIG. 3, the coil component 1 includes a base body 10, a coil 20 provided inside the base body 10, a first external electrode 31 and a second external electrode 32 provided on the surface of the base body 10 and electrically connected to the coil 20.

The coil component 1 is electrically connected to a circuit board interconnect (not shown) via the first and second external electrodes 31 and 32. For example, the coil component 1 is used as a noise removing filter and is used in electronic equipment such as a personal computer, a DVD player, a digital camera, a TV, a mobile phone, or car electronics.

The base body 10 is formed in a substantially rectangular parallelepiped shape. The surface of the base body 10 includes a first end surface 15, a second end surface 16 located opposite to the first end surface 15, and four side surfaces 17 located between the first end surface 15 and the second end surface 16. The first end surface 15 and the second end surface 16 are opposed in the L direction.

The base body 10 includes pluralities of first magnetic layers 11 and second magnetic layers 12. The first magnetic layers 11 and second magnetic layers 12 are alternately laminated in the T direction. The first magnetic layers 11 and the second magnetic layers 12 are made of a magnetic material such as a Ni—Cu—Zn-based ferrite material, for example. The thickness of each of the first magnetic layers 11 and second magnetic layers 12 is 5 μm or more and 30 μm or less (i.e., from 5 μm to 30 μm), for example. Note that the base body 10 may in part include a non-magnetic layer.

The first external electrode 31 covers the entire first end surface 15 of the base body 10 and the end of the side surface 17 of the base body 10 on the first end surface 15 side. The second external electrode 32 covers the entire second end surface 16 of the base body 10 and the end of the side surface 17 of the base body 10 on the second end surface 16 side. The first external electrode 31 is electrically connected to a first end of the coil 20, and the second external electrode 32 is electrically connected to the second end of the coil 20.

Note that the first external electrode 31 may have an L-shape formed over the first end surface 15 and one of the side surfaces 17, and the second external electrode 32 may have an L-shape formed over the second end surface 16 and one of the side surfaces 17.

The coil 20 is helically wound along the T direction. The coil 20 is made of a conductive material such as Ag or Cu, for example. The coil 20 includes a plurality of coil wirings 21 and a plurality of extended conductive layers 61 and 62.

Two first extended conductive layers 61, a plurality of coil wirings 21, and two second extended conductive layers 62 are arranged in an order in the T direction and electrically connected in an order via a via conductor. The plurality of coil wirings 21 are connected to in an order in the T direction and form a helix along the T direction. The first extended conductive layers 61 are exposed from the first end surface 15 of the base body 10 and connected to the first external electrode 31, the second extended conductive layers 62 are exposed from the second end surface 16 of the base body 10 and connected to the second external electrode 32. Note that the numbers of the first and second extended conductive layers 61 and 62 are not particularly limited and may each be one, for example.

The coil wirings 21 are provided on the first magnetic layers 11 and provided in the same layers as the second magnetic layers 12. In this configuration, the thickness of the coil wiring 21 can be kept, and the DC resistance value (Rdc) of the coil wirings 21 can be reduced. That is, the cross-sectional shape of the coil wirings 21, i.e., the shape of a section in a direction orthogonal to the direction in which the coil wirings 21 extend can be formed in a quadrilateral shape such as a trapezoid. Note that the second magnetic layers 12 are omitted in FIG. 3.

Part of the coil wirings 21 is in contact with magnetic layers. Specifically, the coil wirings 21 are in contact with the first magnetic layers 11 and the second magnetic layers 12 at their upper surfaces and left and right surfaces, respectively. In this configuration, the coil wirings 21 are more stably positioned than in the case where the coil wirings 21 are not in contact with the magnetic layers on the entire periphery.

The coil wirings 21 are formed in a shape of being wound by less than one turn on a plane. The extended conductive layers 61 and 62 are formed in a straight-line shape. The thickness of the coil wirings 21 is 10 μm or more and 40 μm or less (i.e., from 10 μm to 40 μm), for example. The thickness of the first and second extended conductive layers 61 and 62 is 10 μm or more and 30 μm or less (i.e., from 10 μm to 30 μm), for example, and may be thinner than the thickness of the coil wirings 21.

Gap portions 51 are present in the base body 10. The gap portions 51 are present between magnetic layers and the coil wirings 21. Specifically, the gap portions 51 are present between the first magnetic layers 11 and the coil wirings 21. By providing the gap portions 51, the stress generated due to the difference in coefficient of thermal expansion between the coil wirings 21 and the first magnetic layers 11 can be suppressed, degradation in the inductance (impedance value) due to the internal stress can be prevented, and a high impedance value (inductance value) can be obtained.

The gap portions 51 are present on surfaces of the coil wirings 21 on one side in the lamination direction, specifically, provided to contact the lower surfaces of the coil wirings 21, and the gap portions 51 are present on the surfaces of the coil wirings 21 on one side in the lamination direction and the first magnetic layer 11 are present on the surfaces on the other side. In this configuration, the coil wirings 21 are stably positioned, and a high impedance value (inductance value) can be obtained.

The maximum thickness of the gap portions 51 is 0.5 μm or more and 8.0 μm or less (i.e., from 0.5 μm to 8.0 μm), for example. As the gap portions 51 have such a maximum thickness, the effect of the stress relief is sufficiently exerted, and in addition, a high impedance value (inductance value) of the coil component is obtained because of the thickness of the gap portions in a certain range.

Figure 4:
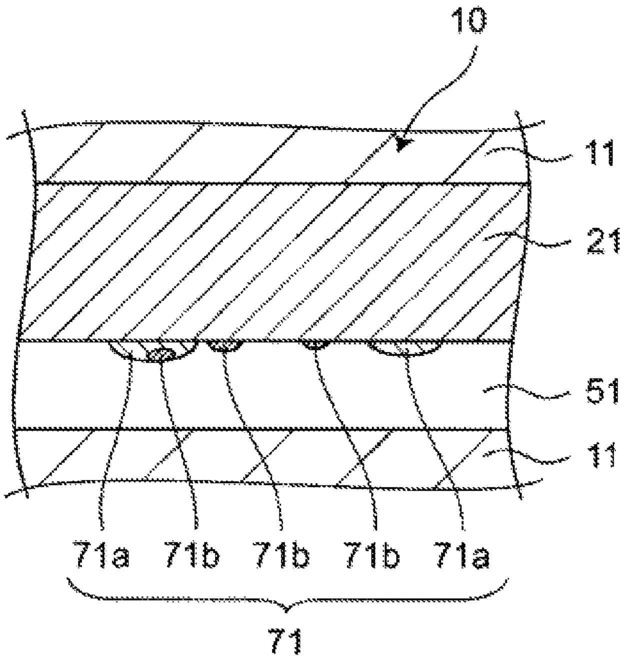
FIG. 4 is an enlarged sectional view of a portion near a coil wiring in FIG. 2.
Figure 5A:
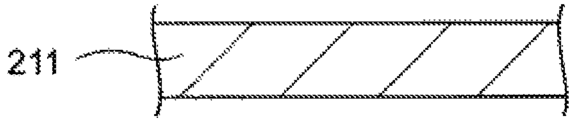
FIG. 5A is an illustrative diagram illustrating an example of a method for manufacturing a coil component.
Figure 5B:
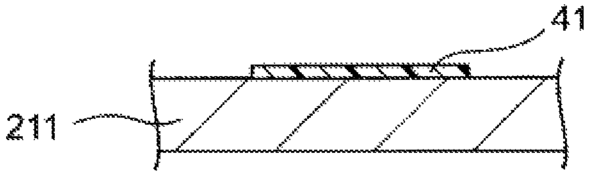
FIG. 5B is an illustrative diagram illustrating an example of a method for manufacturing the coil component.
Figure 5C:
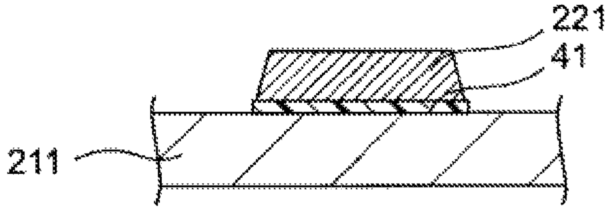
FIG. 5C is an illustrative diagram illustrating an example of the method for manufacturing the coil component.
Figure 5D:
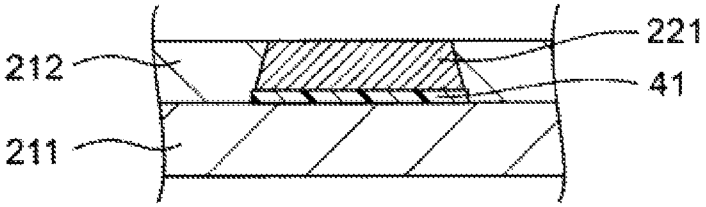
FIG. 5D is an illustrative diagram illustrating an example of the method for manufacturing the coil component.

FIG. 4 shows an enlarged sectional view of a portion near a coil wiring 21 in FIG. 2. As shown in FIG. 4, metal oxide-containing regions 71 are present on parts of the surface of the coil wiring 21 on the gap portion 51 side.

The metal oxide-containing regions 71 may be regions consisting only of a metal oxide, or the metal oxide-containing regions 71 may contain inevitable impurities.

The metal oxide-containing regions 71 include a first metal oxide 71*a* and a second metal oxide 71*b*. The first metal oxide 71*a* and the second metal oxide 71*b* are compounds containing different metals.

The first metal oxide 71*a* is Cu oxide. Since Cu is a metal that can be used as a material constituting the magnetic layers, it is possible to use the same material as the magnetic layers. Since the metal oxides formed outside the coil wiring is absorbed and integrated into the magnetic layer of the base body at the time of firing, variation in size of the gap portion can be reduced, and this can contribute to the suppression of variation in the impedance value and inductance value of the coil component. The Cu oxide can include CuO and $Cu_2O$, for example.

The second metal oxide 71*b* is Zn oxide. Zn is a metal that can be used as a material constituting the magnetic layers. Therefore, it is possible to use the same material as the magnetic layers. Since the metal oxides formed outside the coil wiring is absorbed and integrated into the magnetic layer of the base body at the time of firing, variation in size of the gap portion can be reduced, and this can contribute to the suppression of variation in the impedance value and inductance value of the coil component. In addition, Zn can be melted by utilizing the heat generated at the time of firing, the gap portion is easily formed. Further, the melting point of Zn is 419° C., that is, Zn is a metal having a melting point of 850° C. or less. Therefore, in the case of using Zn, the metal is melted before sintering of a conductive paste that will become the coil wiring is completed, and the gap portion is further easily formed. The Zn oxide can include ZnO, for example.

The shape of the metal oxide-containing regions 71 includes at least one of a land-like shape and a band-like shape, for example. Since the metal oxide-containing regions 71 having the above shape are scattered or dispersed on the surface of the coil wiring, the gap portion can be uniformly formed on the surface of the coil wiring. In addition, since the metal oxide-containing regions 71 are scattered or dispersed, the gap portion 51 is formed with a balanced, stable shape when the gap portion 51 is formed by utilizing the melting of metal as raw materials of the metal oxides.

Here, having a band-like shape means having a continuously elongated shape having a constant width, and can include a long rectangular shape, for example. The constant width includes a substantially constant width. In the case of a band-like shape, the metal oxide-containing region 71 may have a straight-line shape or a curved-line shape.

Having a land-like shape means having a circular shape, an elliptical shape, and/or a shape close to these shapes, and means that the shape has an equivalent circle diameter that can be determined. In the case of a land-like shape, the metal oxide-containing regions 71 may be separated from each other, or the metal oxide-containing regions 71 may be partially in contact with each other, not being wholly separated. In addition, the metal oxide-containing regions 71 may mixedly include regions 71 having a land-like shape and regions 71 having a band-like shape, and a plurality of regions 71 having a land-like shape may be connected by a region 71 having a band-like shape.

When the metal oxide-containing regions 71 have a land-like shape, the metal oxide-containing regions 71 may have an equivalent circle diameter of 0.1 μm or more. Since the land-like shape has an equivalent circle diameter of 0.1 μm or more, a certain amount of metal used for forming the gap portion 51 is obtained. As a result, the gap portion 51 is easily formed.

Here, the equivalent circle diameter means an equivalent circle diameter of a land-like shape in a scanning electron microscope (SEM) image of the surface of the coil wiring 21 viewed from the gap portion 51 side. For example, for the above equivalent circle diameter, the equivalent circle diameter of the land-like shape can be obtained by capturing a SEM image of a certain area (for example, 15 μm×25 μm) of the surface of the coil wiring 21 of the coil component 1 on the gap portion 51 side at a magnification of 5000 times and analyzing the SEM image using image analysis software (for example, A-Zou Kun (registered trademark), manufactured by Asahi Kasei Engineering Corporation). When there are a plurality of types of metal oxides, it is determined regardless of the type of the metal oxide. Note that the type of the metal oxide can be identified by performing element mapping using an energy dispersive X-ray spectrometer (EDS).

The proportion (also referred to as "coverage") of the metal oxide-containing regions 71 may be 10% or more and 80% or less (i.e., from 10% to 80%) of the area of the surface of the coil wiring 21 (the total value of the area of the surface of the coil wiring 21 exposed to the gap portion 51 and the area of the metal oxide-containing regions 71). When the gap portion 51 is formed by utilizing the melting of metal as raw materials of the metal oxides, due to the fact that the proportion of the metal oxide-containing regions 71 is 10% or more, the gap portion 51 can be reliably formed on the surface of the coil wiring 21. In addition, the metal oxide-containing regions 71 do not necessarily need to be formed on the entire coil wiring, and it is sufficient that the proportion thereof is 80% from the viewpoint of the formation of the gap portion.

Here, the proportion of the metal oxide-containing regions 71 can be obtained by determining the proportion of the area of the metal oxide-containing regions 71 relative to the total value of the area of the surface of the coil wiring 21 exposed to the gap portion 51 and the area of the metal oxide-containing regions 71 by capturing an SEM image of a certain area (for example, 15 μm×25 μm) of the surface of the coil wiring 21 of the coil component 1 viewed from the gap portion 51 side at a magnification of 5000 times and analyzing the SEM image using image analysis software (for example, A-Zou Kun (registered trademark), manufactured by Asahi Kasei Engineering Corporation). Note that when there are plurality of types of metal oxides, the metal oxide-containing regions 71 means the region containing all the metal oxides.

Next, an example of a method for manufacturing the coil component 1 will be described using FIG. 5A to FIG. 5D and FIG. 6A to FIG. 6B. Note that the method for manufacturing the coil component 1 is not limited to the following method, and another manufacturing method may be used.

FIG. 5A to FIG. 5D show sections along the width direction of the coil wiring 21, that is, sections orthogonal to the extending direction of the coil wiring 21.

First, a magnetic sheet 211 is prepared. The magnetic sheet 211 can be made by forming magnetic slurry containing a magnetic ferrite material into a sheet and processing it such as by punching as needed, for example. A through hole is formed at a predetermined portion of the magnetic sheet 211 by laser irradiation.

The method for processing the magnetic slurry into a sheet can include a doctor blade method, for example. The resulting sheet has a thickness of 15 μm or more and 25 μm or less (i.e., from 15 μm to 25 μm), for example.

The composition of the magnetic ferrite material is not particularly limited, and can contain $Fe_2O_3$, ZnO, CuO, and NiO, for example. When the magnetic ferrite material contains $Fe_2O_3$, ZnO, CuO, and NiO, the contents thereof are $Fe_2O_3$ in a range of 40.0 mol % or more and 49.5 mol % or less (i.e., from 40.0 mol % to 49.5 mol %), ZnO in a range of 5 mol % or more and 35 mol % or less (i.e., from 5 mol % to 35 mol %), CuO in a range of 6 mol % or more and 12 mol % or less 9 (i.e., from 6 mol % to 12 mol %), and NiO in a range of 8 mol % or more and 40 mol % or less (i.e., from 8 mol % to 40 mol %), for example. The above magnetic ferrite material can further contain an additive. The additive can include $Mn_3O_4$, $Co_3O_4$, $SnO_2$, $Bi_2O_3$, and $SiO_2$, for example.

The magnetic ferrite material is mixed and crushed in a wet process using a method that can be usually performed, and then dried. The dried material obtained by drying is calcined at 700° C. or more and less than 800° C. (i.e., from 700° C. to 800° C.), particularly 700° C. or more and 720° C. or less (i.e., from 700° C. to 720° C.) to form raw material powder. Note that the raw material powder (calcined powder) can contain inevitable impurities.

An aqueous acrylic binder and a dispersant are added to the raw material powder, and mixing and crushing is performed in a wet process to make magnetic slurry. The mixing and crushing in a wet process can be performed in a pot mill together with partially stabilized zirconia (PSZ) balls, for example. Note that the magnetic sheet 211 becomes a first magnetic layer 11 after being fired.

A metal-containing layer 41 is formed on the magnetic sheet 211 in the following manner. Metal contained in the metal-containing layer 41 is to be a raw material of metal oxide, and Cu and Zn are contained in this embodiment. The metal-containing layer 41 can be composed of at least one selected from the group consisting of a metal resinate, a metal salt, and a metal-resin composite, for example.

The metal-containing layer 41 can be formed by applying a solution containing at least one of a metal resinate, a metal salt, and a metal-resin composite such as by splaying and then, as needed, drying it at 70° C. or more and 100° C. or less (i.e., from 70° C. to 100° C.), for example. At this time, a mask or the like can be used as needed. The solution containing at least one of a metal resinate, a metal salt, and a metal-resin composite used may be of a plurality of types or of only one type. For example, in the case of two types, two types of metal resinate solutions may be used in combination, or both of a metal resinate solution containing one and a metal salt-containing solution containing the other may be used.

The metal resinate means an organic metal compound, that is, a compound containing a metal (for example, Zn) and an organic group. Here, the organic group means a group containing a carbon atom. A solvent contained in the metal resinate solution can include isobutanol, butyl carbitol, and the like. The concentration of metal contained in the metal resinate solution is 6 weight % or more and 10 weight % or less (i.e., from 6 weight % to 10 weight %) relative to the entire solution in terms of metal atoms, for example.

The metal salt can include $CuCl_2$ (melting point 498° C.), for example. Note that, since the melting point of $CuCl_2$ is lower than the sintering temperature (for example, 850° C.) of a coil conductive paste that is to be the coil wiring, in the case of using $CuCl_2$, it is melted during firing, and the gap portion can be easily formed.

The metal salt-containing solution can use a metal salt-containing aqueous solution. Note that the metal salt-containing solution may be any solution in which a metal salt is dissolved, and may be a solution containing a metal salt and an organic solvent or a solution containing a metal salt, an organic solvent, and water, for example.

The concentration of metal contained in the metal salt-containing solution is 6 weight % or more and 10 weight % or less (i.e., from 6 weight % to 10 weight %) relative to the entire solution in terms of metal atoms, for example.

In the metal-resin composite, metal powder or metal salt powder is dispersed or dissolved in a resin, for example. The metal can include Zn, for example, and the metal salt can include $CuCl_2$, for example.

A coil conductive paste layer 221 is formed by, for example, screen printing of a first conductive paste on the metal-containing layer 41. As the first conductive paste, a paste containing Ag powder, a solvent, a resin, and a dispersant can be used, for example. The solvent can include eugenol, for example, and the resin can include ethyl cellulose, for example. For preparing the above-described paste-like conductive composition, a method that can be usually performed can be used, and it can be made by mixing Ag powder, a solvent, a resin, and a dispersant in a planetary mixer and then dispersing them with a three-roll mill, for example. Note that the coil conductive paste layer 221 becomes the coil wiring 21 after being fired.

Thereafter, a magnetic paste layer 212 is provided on the magnetic sheet 211 and in the same layer as the coil conductive paste layer 221. The magnetic paste layer 212 can be formed by screen printing of the following magnetic paste. Note that the magnetic paste layer 212 becomes a second magnetic layer 12 after being fired.

The magnetic paste is a paste-like composition and contains a solvent, raw material powder, a resin, and a plasticizer, and can be formed by kneading them in a planetary mixer and then dispersing them with a three-roll mill.

The raw material powder can be obtained by calcining a magnetic ferrite material. The magnetic ferrite material used may be a material similar to the magnetic ferrite material of the magnetic sheet. The calcination of the magnetic ferrite material can be achieved by mixing and crushing it in a wet process using a method that can be usually performed, then drying it, and calcining the dried material obtained by the drying at 800° C. or more and 820° C. or less (i.e., from 800° C. to 820° C.). Note that the raw material powder can contain inevitable impurities.

The coil wiring 21 is formed on the first magnetic layer 11 by the method shown in FIG. 5A to FIG. 5D above.

Figure 6A:
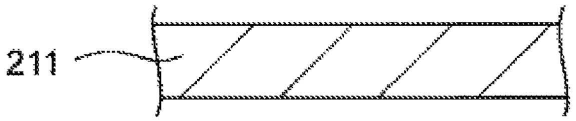
FIG. 6A is an illustrative diagram illustrating an example of the method for manufacturing the coil component.
Figure 6B:
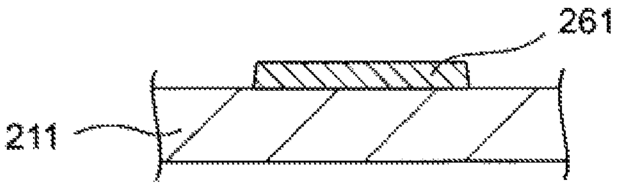
FIG. 6B is an illustrative diagram illustrating an example of the method for manufacturing the coil component.

As shown in FIG. 6A, for a first extended conductive layer 61, a first extended conductive paste layer 261 is formed by first preparing a magnetic sheet 211 and then performing screen printing of a second conductive paste on the magnetic sheet 211 as shown in FIG. 6B. Note that the first extended conductive paste layer 261 becomes the first extended conductive layer 61 after being fired. Note that a second extended conductive layer 62 is also formed in the same way as the first extended conductive layer 61.

The second conductive paste is a paste-like composition, and a paste containing Ag powder, a solvent, a resin, and a dispersant can be used, for example. The same material as the first conductive paste can also be used.

A lamination block is made by performing thermocompression bonding of these.

Thereafter, the formed lamination block is subjected to operations that can be usually performed, such as dicing, firing, and external electrode formation, for example, to form the coil component 1. The dicing, firing, and external electrode formation can be performed using a method that can be usually performed. For example, the dicing can be performed by cutting the resulting lamination block such as with a dicer. As needed, corners or the like are rounded by performing rotation barrel polishing. The external electrode can be provided by immersing an end surface at which an extended conductive layer is exposed in a layer formed by extending Ag paste to a predetermined thickness, baking it at a temperature of about 800° C. to form an underlying electrode, and then sequentially forming a Ni film and a Sn film on the underlying electrode by electrolytic plating.

The firing can be performed at a temperature of 880° C. or more and 920° C. or less (i.e., from 880° C. to 920° C.) (a temperature for sintering the magnetic slurry and magnetic paste that will become magnetic layers). It can be considered that the metal or metal salt contained in the metal-containing layer 41 melts at a temperature up to a temperature at which the sintering of the first conductive paste, for example, Ag paste is completed during temperature rise at the time of firing. The temperature at which the sintering of the Ag paste is completed is 850° C., for example. In contrast, for example, since the melting point of Zn is 419° C., a metal resinate of Zn also melts at 419° C. In addition, the melting point of $CuCl_2$ is 498° C. Therefore, it can be considered that both the metal and the metal salt melt at a temperature lower than the temperature at which the sintering of the Ag paste is completed.

It can be considered that, when the metal or metal salt melts as described above, the bonding strength of a portion between the coil wiring 21 and the first magnetic layer 11 or the second magnetic layer 12 and at which the metal-containing layer 41 has been present is lowered, and the gap portion 51 is formed between the coil wiring 21 and the first magnetic layer 11 or the second magnetic layer 12 when the coil wiring 21 shrinks. In addition, it can be considered that, at least part of the metal or metal salt contained in metal-containing layer 41 is oxidized to form a metal oxide during temperature rise at the time of firing.

SECOND EMBODIMENT

Figure 7:
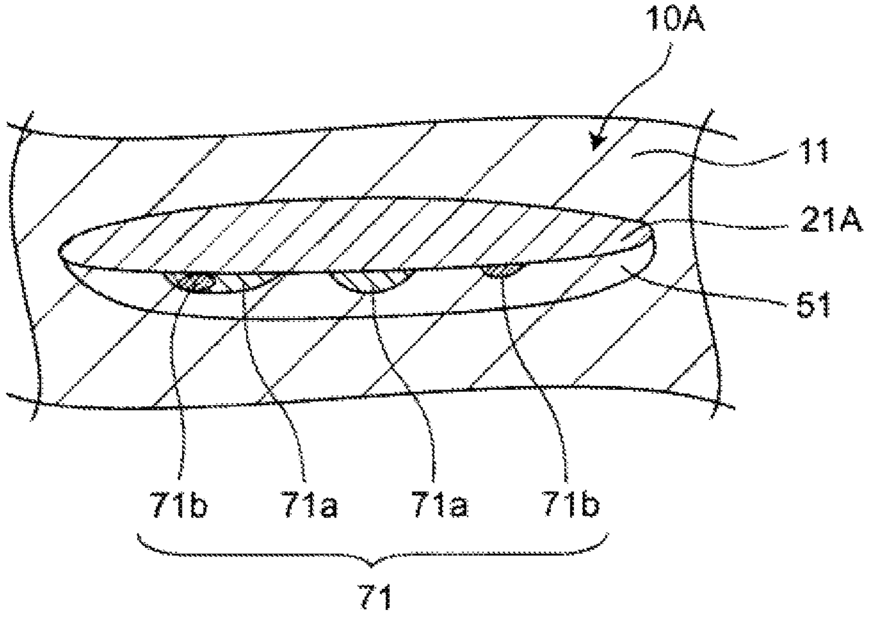
FIG. 7 is an enlarged sectional view of a portion near a coil wiring of a coil component in a second embodiment.

FIG. 7 shows a second embodiment of the coil component 1 of the present disclosure and shows an enlarged sectional view of a portion near a coil wiring 21A. In the second embodiment, there is no second magnetic layer 12, and the shape of the coil wiring 21A is different than in the first embodiment.

Note that, in the second embodiment, portions with the same reference characters as in the first embodiment indicate the same components. The description of the same components as in the first embodiment may be omitted.

As shown in FIG. 7, the section of a base body 10A in a direction orthogonal to the extending direction of the coil wiring 21A has an oval shape. The upper surface of the coil wiring 21A contacts the first magnetic layer 11. Note that the coil wiring 21A can be similar to the coil wiring 21 in the first embodiment except for its shape.

Metal oxide-containing regions 71 are present on parts of the lower surface of the coil wiring 21A on the gap portion 51 side. The metal oxide-containing regions 71 include a first metal oxide 71*a* and a second metal oxide 71*b*.

Note that the present disclosure is not limited to the above-described embodiments, and design changes are possible without departing from the spirit of the present disclosure.

Although the first magnetic layer 11 is provided on the entire upper surface of the coil wiring 21 in the first embodiment, it may be provided on only part of the upper surface. Similarly, although the second magnetic layer 12 is provided on the entire left and right upper surfaces of the coil wiring 21 in the above embodiment, it may be provided on only a part thereof.

Although the gap portion 51 is provided on the lower surface of the coil wiring in the first embodiment, it may be provided on the upper surface of the coil wiring 21.

In addition, although the gap portion 51 is provided between the coil wiring 21 and the first magnetic layer 11 in the first embodiment, it may be provided between the coil wiring 21 and the second magnetic layer 12, or may be provided between the coil wiring 21 and the first magnetic layer 11 and between the coil wiring 21 and the second magnetic layer 12.

Although the first metal oxide 71*a* and the second metal oxide 71*b* are mentioned as metal oxides contained in the metal oxide-containing region 71 in the first embodiment, the metal oxides may be replaced with a single compound (that is, only the first metal oxide 71*a*) or three or more types of compounds.

Although Cu and Zn are mentioned as metals contained in the metal oxide-containing region 71 in the first embodiment, metals other than Cu and Zn can include Bi and Sn. In other words, the metal oxides may include at least one of Cu oxide, Zn oxide, Bi oxide, and Sn oxide. Since Bi and Sn, as with Cu and Zn, are metals that can be used as materials constituting the magnetic layers, it is possible to use the same material as the magnetic layers. Since the metal oxides formed outside the coil wiring is absorbed and integrated into the magnetic layer of the base body at the time of firing, variation in size of the gap portion can be reduced, and this can contribute to the suppression of variation in the impedance value and inductance value of the coil component. In addition, the above-mentioned metals can be melted by utilizing the heat generated at the time of firing, and the gap portion is easily formed. Further, since the melting point of Bi is 271° C. and the melting point of Sn is 232° C., Bi and Sn are metals having a melting point of 850° C. or less, at which the sintering of the conductive paste that is to be the coil wiring is completed. Therefore, in the case of using these metals, the metals are melted during temperature rise at the time of firing, and the gap portion is further easily formed. The Bi oxide can include $Bi_2O_3$, for example, and the Sn oxide can include SnO, $SnO_4$, $SnO_3$, for example.

Although Cu and Zn are mentioned as metals contained in the metal-containing layer 41 in the first embodiment, metals other than Cu and Zn can include Bi and Sn.

Bi and Sn can be used as a metal resinate and/or a metal-resin composite, for example.

EXAMPLES

Next, the surface of the coil wiring 21 viewed from the gap portion 51 side will be described using examples.

Note that FIGS. 8A to 8C and FIGS. 9 to 11 are diagrams created from SEM images obtained by sectioning the coil component at the surface of the coil wiring 21 on the gap portion 51 side after the coil component is formed and capturing images of the surface in a direction orthogonal to the gap portion 51 of the coil wiring 21.

Example 1

The coil component of the first embodiment was manufactured. The metal-containing layer 41 was formed by applying a Zn resinate solution and then applying an aqueous solution containing $CuCl_2$.

Figure 8A:
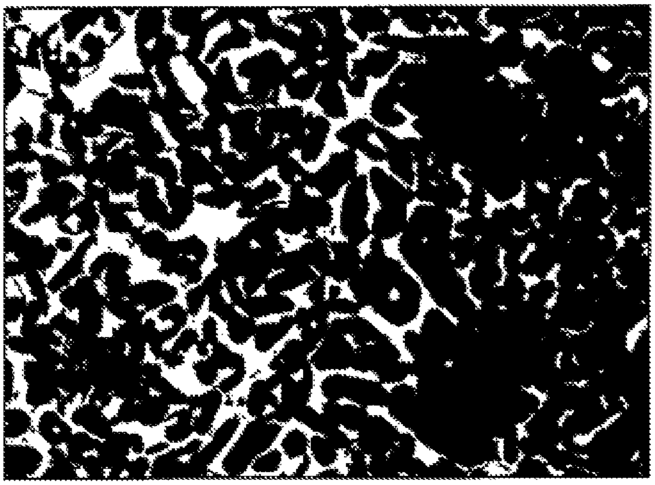
FIG. 8A is an illustrative diagram of a surface of a coil wiring in Example 1, showing a copper oxide and a zinc oxide formed on the surface of the coil wiring.

In FIG. 8A, portions indicated in black are metal oxide-containing regions 71, specifically, regions consisting of copper oxide and zinc oxide. White portions in FIG. 8A are portions of the coil wiring 21 exposed to the gap portion 51. In FIG. 8A, the proportion of the metal oxide-containing regions 71 was 76%.

Figure 8B:
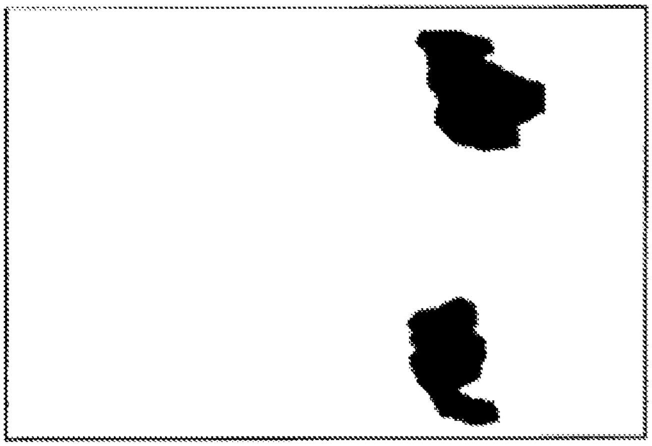
FIG. 8B is an illustrative diagram showing only the copper oxide in FIG. 8A.

FIG. 8B is a diagram obtained by extracting only the copper oxide from FIG. 8A. The copper oxide had a land-like shape.

Figure 8C:
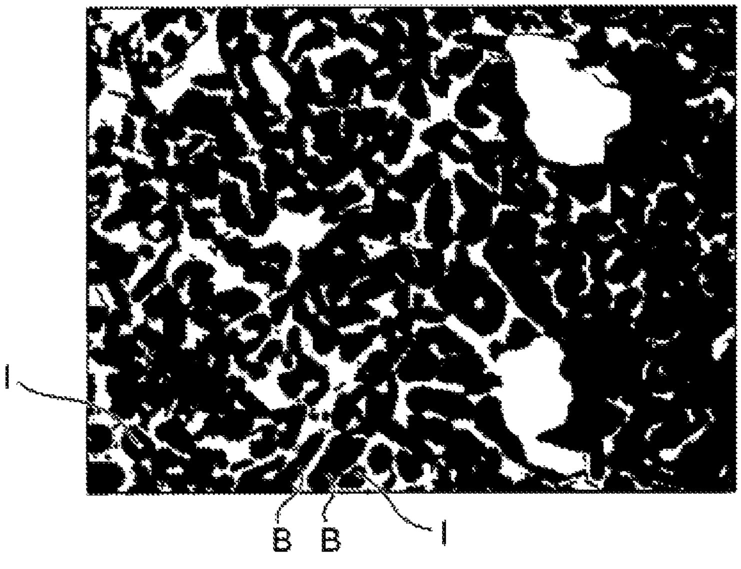
FIG. 8C is an illustrative diagram showing only the zinc oxide in FIG. 8A.

FIG. 8C is a diagram obtained by extracting only the zinc oxide from FIG. 8A. The zinc oxide had a land-like shape and a band-like shape. For example, in FIG. 8C, portions with the reference character "I" have a land-like shape, and portions with the reference character "B" have a band-like shape.

Example 2

In this example, one type of metal is contained in the metal oxide-containing regions 71.

A $CuCl_2$ aqueous solution was used to form the metal-containing layer 41.

Figure 9:
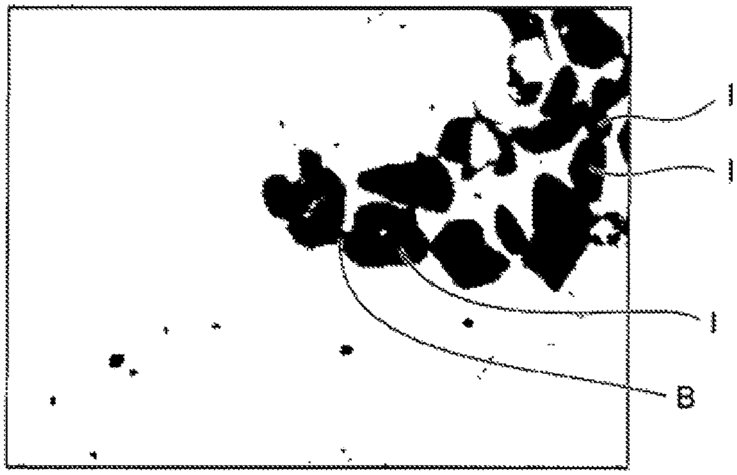
FIG. 9 is an illustrative diagram of a surface of a coil wiring in Example 2, showing a copper oxide formed on the surface of the coil wiring.

In FIG. 9, portions indicated in black are metal oxide-containing regions 71, specifically, regions consisting of copper oxide. In FIG. 9, the proportion of the metal oxide-containing regions 71 was 14%, and the copper oxide had a land-like shape and a band-like shape. For example, in FIG. 9, portions with the reference character "I" have a land-like shape, and portions with the reference character "B" have a band-like shape.

Example 3

In this example, one type of metal is contained in the metal oxide-containing regions 71.

A Zn resinate solution was used to form the metal-containing layer 41.

Figure 10:
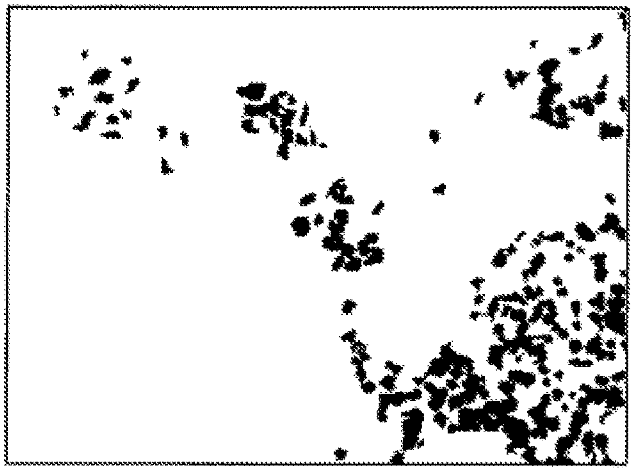
FIG. 10 is an illustrative diagram of a surface of a coil wiring in Example 3, showing a zinc oxide formed on the surface of the coil wiring.

In FIG. 10, portions indicated in black are metal oxide-containing regions 71, specifically, regions consisting of zinc oxide. In FIG. 10, the proportion of the metal oxide-containing regions 71 was 10%, and the zinc oxide had a land-like shape. The zinc oxide had an equivalent circle diameter of 0.114 μm or more.

Example 4

In this example, one type of metal is contained in the metal oxide-containing regions 71.

A $CuCl_2$ aqueous solution was used to form the metal-containing layer 41.

Figure 11:
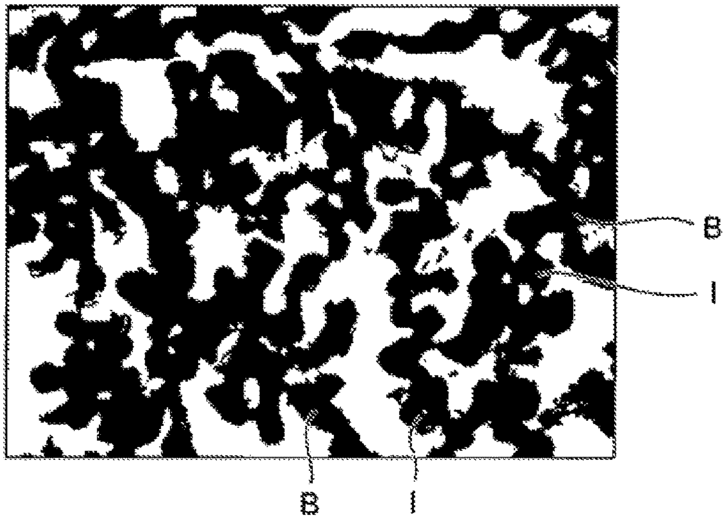
FIG. 11 is an illustrative diagram of a surface of a coil wiring in Example 4, showing a copper oxide formed in a band-like shape on the surface of the coil wiring.

In FIG. 11, portions indicated in black are metal oxide-containing regions 71, specifically, regions consisting of copper oxide. In FIG. 11, the proportion of the metal oxide-containing regions 71 was 60%, and the copper oxide had a land-like shape and a band-like shape. For example, in FIG. 11, portions with the reference character "I" had a land-like shape, and portions with the reference character "B" had a band-like shape.

What is claimed is:

1. A coil component comprising:

a base body including a plurality of laminated magnetic layers; and a coil provided in the base body, the coil including a plurality of laminated coil wirings, the magnetic layers and the coil wirings being alternately laminated, with a gap portion existing between each of the magnetic layers and each of the coil wirings, a portion of the coil wirings being in contact with the magnetic layers, and a region containing a metal oxide being present on a part of a surface of each of the coil wirings on a gap portion side.

2. The coil component according to claim 1, wherein a melting point of a metal contained in the metal oxide is 850° C. or less.

3. The coil component according to claim 1, wherein the metal oxide comprises at least one of Cu oxide, Zn oxide, Bi oxide, and Sn oxide.

4. The coil component according to claim 1, wherein a shape of the region containing the metal oxide comprises at least one of a land-like shape and a band-like shape.

5. The coil component according to claim 4, wherein the shape of the region containing the metal oxide comprises a land-like shape, and the land-like shape has an equivalent circle diameter of 0.1 μm or more.

6. The coil component according to claim 1, wherein a proportion of the region containing the metal oxide with respect to a surface area of the coil wiring is from 10% to 80%.

7. The coil component according to claim 1, wherein a maximum thickness of the gap portion is in a range of from 0.5 μm to 8.0 μm.

8. The coil component according to claim 1, wherein the gap portion is present on a surface of the coil wiring on one side in a lamination direction.

9. The coil component according to claim 2, wherein a shape of the region containing the metal oxide comprises at least one of a land-like shape and a band-like shape.

10. The coil component according to claim 3, wherein a shape of the region containing the metal oxide comprises at least one of a land-like shape and a band-like shape.

11. The coil component according to claim 2, wherein a proportion of the region containing the metal oxide with respect to a surface area of the coil wiring is from 10% to 80%.

12. The coil component according to claim 3, wherein a proportion of the region containing the metal oxide with respect to a surface area of the coil wiring is from 10% to 80%.

13. The coil component according to claim 4, wherein a proportion of the region containing the metal oxide with respect to a surface area of the coil wiring is from 10% to 80%.

14. The coil component according to claim 5, wherein a proportion of the region containing the metal oxide with respect to a surface area of the coil wiring is from 10% to 80%.

15. The coil component according to claim 2, wherein a maximum thickness of the gap portion is in a range of from 0.5 μm to 8.0 μm.

16. The coil component according to claim 3, wherein a maximum thickness of the gap portion is in a range of from 0.5 μm to 8.0 μm.

17. The coil component according to claim 4, wherein a maximum thickness of the gap portion is in a range of from 0.5 μm to 8.0 μm.

18. The coil component according to claim 2, wherein the gap portion is present on a surface of the coil wiring on one side in a lamination direction.

19. The coil component according to claim 3, wherein the gap portion is present on a surface of the coil wiring on one side in a lamination direction.

* * * * *